United States Patent [19]

Booth et al.

[11] Patent Number: 5,036,964

[45] Date of Patent: Aug. 6, 1991

[54] ARMATURE ASSEMBLY FOR AN ELECTROMAGNETIC COUPLING

[75] Inventors: Dwight E. Booth, Janesville, Wis.; Daniel L. DeYoung, Roscoe, Ill.

[73] Assignee: Dana Corporation, Toledo, Ohio

[21] Appl. No.: 500,466

[22] Filed: Mar. 28, 1990

[51] Int. Cl.$^5$ ............................................. F16D 27/07
[52] U.S. Cl. ........................... 192/84 C; 192/106.1; 192/109 R
[58] Field of Search ............. 192/84 C, 106.1, 109 B, 192/109 R, 111 R; 335/270, 277

[56] References Cited

U.S. PATENT DOCUMENTS

| | | | |
|---|---|---|---|
| 3,036,679 | 5/1962 | Millington et al. | 192/84 C |
| 3,307,669 | 3/1967 | Klinkenberg | 192/84 C |
| 3,565,223 | 2/1971 | Pierce | 192/106.1 |
| 4,187,939 | 2/1980 | Silvestrini et al. | 192/84 |
| 4,445,606 | 5/1984 | Van Laningham | 192/106 |
| 4,493,407 | 1/1985 | Newton | 192/84 |
| 4,624,354 | 11/1986 | Koitabashi | 192/106.1 |
| 4,793,457 | 12/1988 | Siewert et al. | 192/84 C |

FOREIGN PATENT DOCUMENTS 0065328 4/1985 Japan ................... 192/106.1

Primary Examiner—Allan D. Herrmann
Assistant Examiner—Andrea Pitts
Attorney, Agent, or Firm—Leydig, Voit & Mayer

[57] ABSTRACT

An armature assembly for an electromagnetic clutch includes a plastic spider having a central sleeve which is joined to a central driven hub by insert molding. A circular web is molded integrally with and extends radially from the sleeve and carries an annular armature disc which is adapted to coact with the electromagnetic rotor of the clutch. When the clutch is energized, the web flexes adjacent the sleeve in the manner of a living hinge to enable the armature disc to move axially into engagement with the rotor. Upon de-energization of the clutch, the resilient memory of the plastic retracts the armature disc from the rotor. In addition to eliminating the need for separate springs and other components, the plastic spider provides torsional and acoustical dampening.

15 Claims, 2 Drawing Sheets

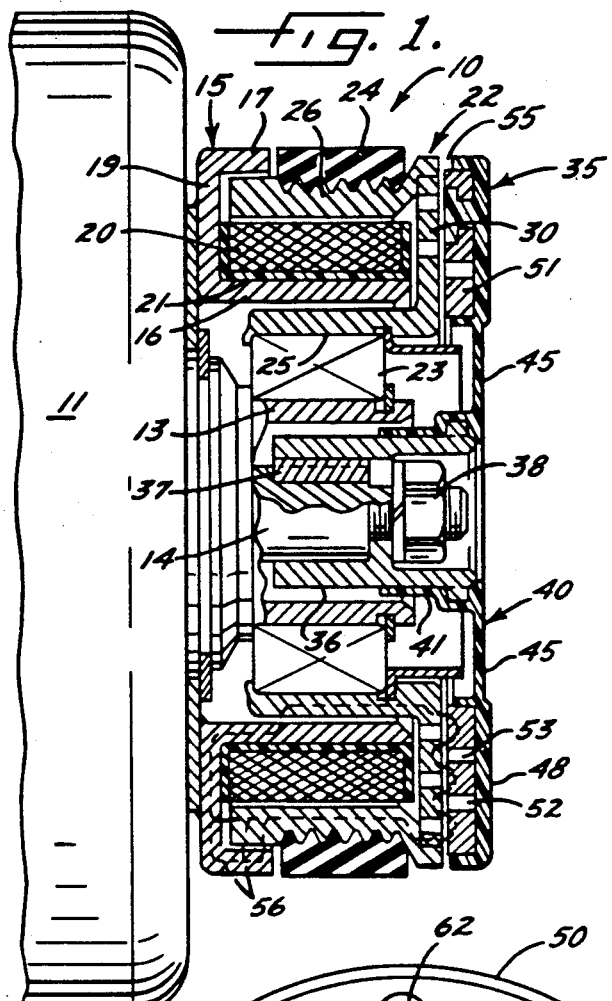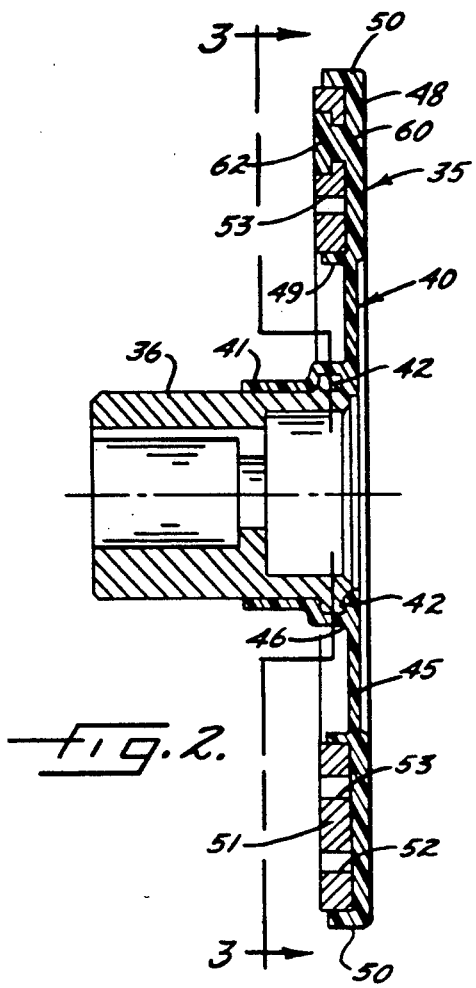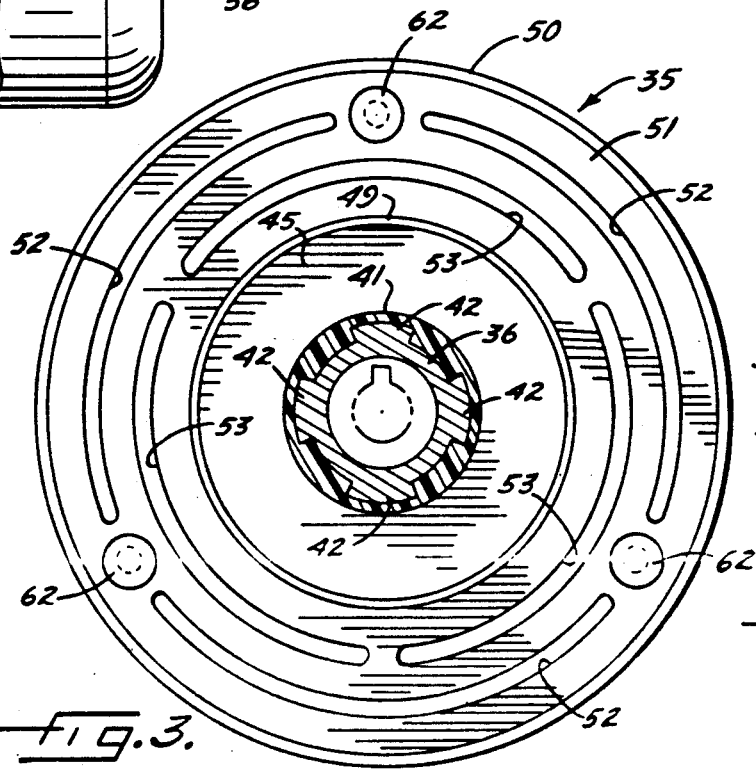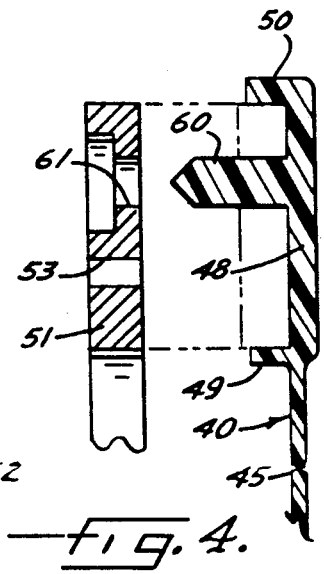

ARMATURE ASSEMBLY FOR AN ELECTROMAGNETIC COUPLING

BACKGROUND OF THE INVENTION

This invention relates generally to an electromagnetic coupling such as a clutch or brake and, more particularly, to an armature assembly for such a coupling.

Newton U.S. Pat. No. 4,493,407 discloses a typical electromagnetic clutch in which an armature is connected to a driven hub by a mounting plate and is adapted to be frictionally coupled to a driving rotor when an electromagnet is energized to engage the clutch. When the clutch is engaged, the rotor acts through the armature and the mounting plate to rotate the driven hub.

In clutches of the type disclosed in the Newton patent, the armature is connected to the mounting plate by a series of leaf springs which couple the armature and mounting plate for rotation in unison while allowing the armature to move toward and away from the rotor when the electromagnet is energized and de-energized. Each spring usually is riveted at one end to the armature and at the other end to the mounting plate.

Torsional shock occurs when the clutch is first engaged and torsional spikes are created during steady state operation of the clutch. In order to dampen the torsional shock and to smooth the spikes, the clutch of the Newton patent utilizes an elastomeric spider between the mounting plate and the driven hub.

Clutches of the type disclosed in the Newton patent have experienced significant commercial success over the years. There exists a need, however, to reduce the cost, the complexity and the axial length of such a clutch. Because the armature assembly of the Newton clutch includes several components which must be separately fabricated and assembled, the clutch tends to be somewhat expensive. Moreover, the multiple components of the Newton armature assembly occupy significant space in an axial direction and thus the clutch does not lend itself for installation in extremely confined areas.

SUMMARY OF THE INVENTION

The general aim of the present invention is to provide a new and improved armature assembly which, when compared with prior assemblies of the same general type, requires significantly fewer parts and is more axially compact while achieving superior torsional and acoustical dampening.

A more detailed object of the invention is to achieve the foregoing by providing an armature assembly in which a resiliently yieldable web acts to connect an armature disc for rotation with the driven hub. The web flexes axially in the manner of a living hinge in order to permit the armature disc to move toward and away from the rotor and, at the same time, yields torsionally in order to provide torsional and acoustical dampening. By virtue of utilizing the flexible web, the leaf springs, the mounting plate and the elastomeric spider of prior clutches all may be eliminated so as to significantly reduce both the cost and the size of the clutch.

The invention also resides in the provision of unique means for preventing elements of the armature assembly from flying out of the clutch in the event the flexible web should fail during operation of the clutch.

These and other objects and advantages of the invention will become more apparent from the following detailed description when taken in conjunction with the accompanying drawings.

BRIEF DESCRIPTION OF THE DRAWINGS

FIG. 1 is a sectional view of a typical electromagnetic coupling equipped with one embodiment of a new and improved armature assembly incorporating the unique features of the present invention.

FIG. 2 is an enlarged sectional view of the armature assembly shown in FIG. 1.

FIG. 3 is a cross-section taken substantially along the line 3—3 of FIG. 2.

FIG. 4 is an exploded view of certain parts of the armature assembly.

DETAILED DESCRIPTION OF THE PREFERRED EMBODIMENTS

Figure 5:
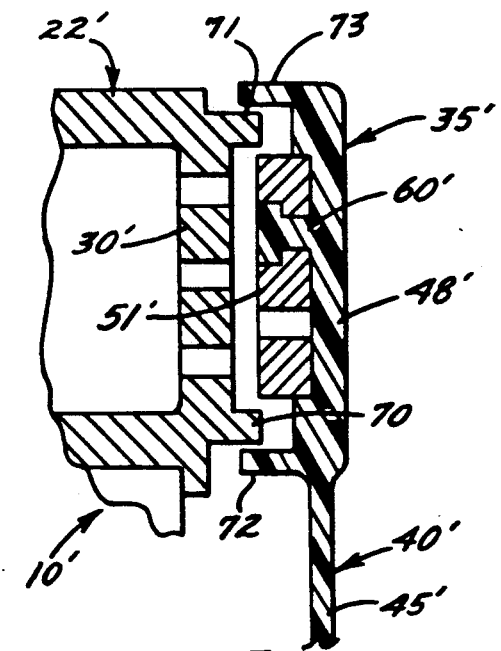
FIG. 5 is a fragmentary sectional view showing another embodiment of an armature assembly constructed in accordance with the invention.

For purposes of illustration, the present invention is shown in connection with an electromagnetic coupling 10 which could be a brake but which herein is in the form of an electromagnetic clutch. The clutch 10 is shown as being used in conjunction with an automobile air conditioning compressor 11 having a tubular nose 13 for mounting the clutch and having a drive shaft 14 which extends through the nose.

The clutch 10 includes an electromagnet which is formed in part by an annular magnet core 15 of substantially J-shaped radial cross-section and having an inner pole ring 16 and an outer pole ring 17. Formed integrally with and extending radially between the rear ends of the two pole rings is a bridge 19 which is rigidly secured to the end of the compressor 11. A multiple turn winding 20 is secured within a U-shaped channel 21 which, in turn, is fastened to the outer side of the inner pole ring 16. Reference may be made to Newton et al U.S. Pat. No. 4,160,498 for a more detailed disclosure of the magnet core 15.

An annular rotor 22 is rotatably journaled on the nose 13 of the compressor 11 by a bearing 23 and is adapted to be driven from the engine of the vehicle by an endless belt 24. The rotor is substantially U-shaped in radial cross-section and includes inner and outer concentric annular pole pieces 25 and 26 made of magnetic material, the inner pole piece being secured to the outer race of the bearing. Several axially spaced grooves extend circumferentially around the outer side of the outer pole piece 26 and interfit with complemental ribs on the inner side of the drive belt. Accordingly, the outer pole piece defines a pulley for the belt.

The inner pole piece 25 of the rotor 22 is spaced inwardly from the inner pole ring 16 of the magnet core 15 while the outer pole piece 26 of the rotor is located between and is spaced from the winding 20 and the outer pole ring 17 of the core. When the winding 20 is excited by a voltage source, magnetic flux is produced and threads through the core and the rotor and across the various gaps between the pole rings and the pole pieces. The nature of the controlled flux transfer between the core and the rotor is explained in more detail in the aforementioned Newton et al patent.

Connected to and extending between the pole pieces 25 and 26 of the rotor 22 is an axially facing friction face 30 which is circumferentially slotted in a conventional manner so as to define multiple magnetic poles. When the winding 20 is energized, the friction face forms a rotatable magnetic field member.

Located in opposing relation to the rotor face 30 is an armature assembly 35. When the winding 20 is excited, magnetic flux draws part of the armature assembly into frictional engagement with the rotor face 30 so as to couple the armature assembly and the rotor for rotation in unison. Rotation of the armature assembly is transmitted to the shaft 14 in order to drive the compressor 11.

In accordance with the present invention, the armature assembly 35 is of greatly simplified construction requiring the use of relatively few parts and enabling the axial length of the clutch 10 to be significantly reduced. In large, these ends are achieved through the use of a unique living hinge which enables the armature assembly to move as required while dampening torsional and acoustical shock.

More specifically, the armature assembly 35 includes a tubular hub 36 (FIG. 2) which is preferably but not necessarily made of powdered metal. The hub is telescoped onto the compressor shaft 14, is keyed to the shaft at 37 (FIG. 1) and is clamped in an axially fixed position on the shaft by a nut 38 which is threaded onto the free end portion of the shaft.

In keeping with the invention, the armature assembly 35 includes a spider 40 which is injection molded of resiliently yieldable material such as plastic. A suitable material for the spider is Dupont Zytel ST 801-HS.

As shown in FIG. 2, the spider 40 includes an axially extending central sleeve 41 which encircles the outer end portion of the hub 36. The hub preferably is insert molded in place when the spider is molded and thus the plastic of the sleeve is bonded to and encapsulates the outer end portion of the hub. To couple the sleeve and the hub for rotation in unison, the hub is formed with four radially extending and angularly spaced lugs 42 (FIG. 3). When the spider is molded, the plastic flows into and fills the space between the lugs and thus prevents relative rotation between the hub and the sleeve. Each lug 42 also defines two shoulders which face in opposite axial directions and which are engaged by the plastic of the sleeve 41 to captivate the sleeve axially on the hub.

Importantly, the spider includes a web 45 molded integrally with and extending radially from the outer end of the sleeve 41. The web is preferably circular and is comparatively thin in the axial direction. Because the plastic is flexible, the web 45 is capable of flexing axially relative to the sleeve 41 at a living hinge 46 (FIG. 2) defined at the junction of the web with the sleeve.

The plastic spider 40 is completed by an annular channel 48 of generally C-shaped cross-section formed integrally with the outer margin of the web 45. The channel opens axially toward the rotor 22 and is defined in part by inner and outer annular flanges 49 and 50.

In this instance, the armature itself is formed by an annular disc 51 made of low magnetic reluctance material such as AISI 1010 steel. The armature disc 51 is seated in the channel 48 and is formed with two radially spaced rows 52 and 53 of angularly spaced slots. The slots cause the armature disc 51 to have magnetic poles which coact with the poles of the face 30 of the rotor 22. When the winding 20 is de-energized, a narrow axial air gap 55 (FIG. 1) exists between the pole faces of the rotor and the pole faces of the armature disc. Upon energization of the winding, magnetic flux threading along a path 56 (FIG. 1) cuts across the gap 55 to draw the armature disc 51 into frictional engagement with the rotor and thereby couple the armature disc for rotation with the rotor.

The armature disc 51 may be coupled to the spider 40 in various ways. In the preferred embodiment, three angularly spaced pins 60 (FIG. 4) are molded integrally with the closed end of the channel 48 and project toward the rotor 22. The armature disc 51 is formed with three countersunk holes 61 for accepting the pins. After the pins have been inserted through the holes, the free end portions of the pins are heat staked so as to form enlarged heads 62 (FIGS. 2 and 3) which clamp the armature disc within the channel.

With the foregoing arrangement, the web 45 flexes at the hinge 46 to enable the armature disc 51 to be drawn into engagement with the rotor 22 when the winding 20 is energized. When the winding is de-energized, the resiliency of the plastic at the hinge causes the web to spring back and retract the armature disc from the rotor. Accordingly, the need for separate springs is completely avoided as is the need for a mounting member for supporting such springs. The plastic spider may be molded an appropriate color and thus there is no need to paint the armature assembly 35 either for color matching or for corrosion protection.

The plastic spider 40 also serves to absorb torsional shock and dampen acoustical vibration and thus the need for separate elastomeric cushioning elements is eliminated. It has been found that the torsional and acoustical vibration damping effected by the present armature assembly is superior to that of the armature assembly of Newton U.S. Pat. No. 4,493,407.

Once the armature assembly 35 has been engaged for some time under load, the hinge 46 tends to heat set and to spring back through a shorter distance when the clutch 10 is disengaged. As a result of this phenomena, the air gap 55 is maintained at a more nearly constant dimension as the rotor face 30 and the armature disc 51 wear since the hinge action changes in accordance with such wear. Thus, the armature assembly inherently possesses autogapping characteristics.

FIG. 5 shows a clutch 10' with a slightly modified rotor 22' and slightly modified armature assembly 35'. In this instance, the friction face 30' of the rotor is formed with inner and outer circumferentially extending lips 70 and 71 which project axially toward the armature assembly. The channel 48' of the spider 40' is formed with oppositely projecting inner and outer lips 72 and 73 located inside and outside of the lips 70 and 71, respectively.

If the compressor shaft 14 should lock up, considerable heat is generated as the rotor 22' slips past the stopped armature assembly 35'. The pins 60' are designed to shear and free the armature disc 51' from the channel 48' if the temperature of the pins exceeds a predetermined value. By freeing the armature disc, the drive to the locked compressor shaft is cut off in order to reduce damage to the compressor 11. The lips 70 to 73 coact with one another to define a chamber which captures the loose armature disc 51' and prevents the disc from flying dangerously away from the clutch 10'.

Figure 6:
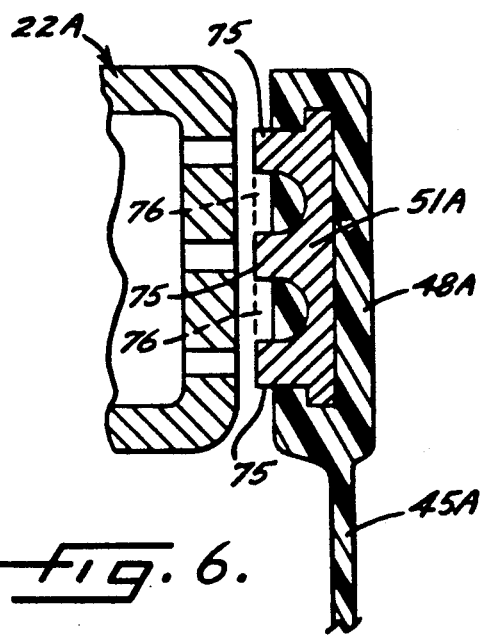
FIG. 6 is a view similar to FIG. 5 but shows still another embodiment.

In the embodiment shown in FIG. 6, an enlarged plastic portion 48A is formed integrally with the outer periphery of the web 45A. The armature disc 51A is defined by a steel member having a series of radially spaced rings 75 which define poles disposed in opposing relation with the rotor 22A. In this instance, the armature disc 51A is molded in place within the enlarged portion 48A and is partially encapsulated by the plastic thereof, the plastic partially filling the spaces between the rings 75. Thus, the armature disc is assembled as an incident to the molding operation so as to eliminate the need for a separate assembly operation. If desired, friction material 76 similar to brake lining may be pressed into the spaces between the rings 75 and may be bonded to the plastic.

Figure 7:
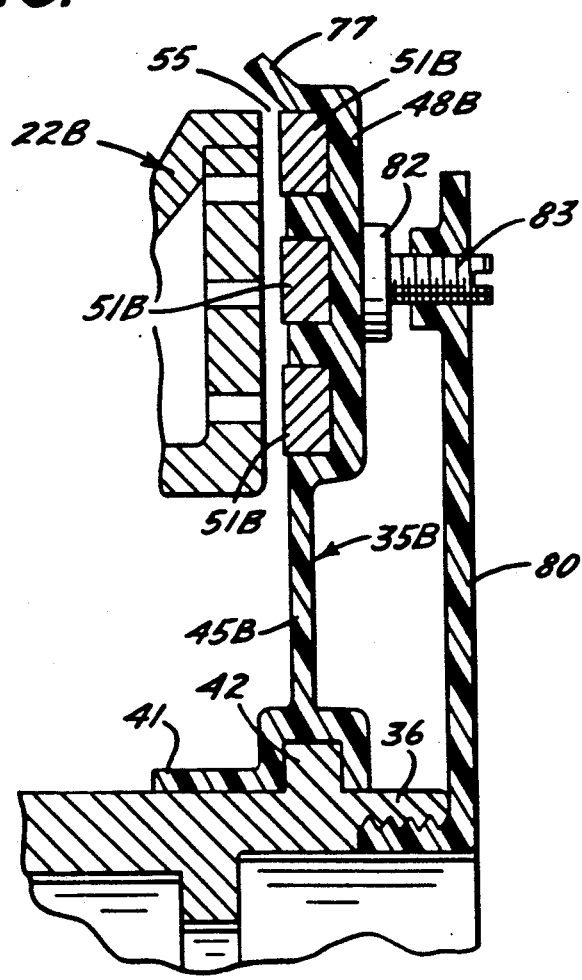
FIG. 7 is a view showing yet another embodiment of an armature assembly.

Still another embodiment is shown in FIG. 7 and, in this case, three armature discs or rings 51B are partially encapsulated by an enlarged plastic portion 48B integral with the outer margin of the web 45B. An inclined fin 77 at the outer periphery of the enlarged portion 48B spans the air gap 55 to serve as a splash guard and restrict the entry of contamination into the air gap.

The embodiment of FIG. 7 is particularly characterized by the provision of a circular retention plate 80 which is secured to and extends radially from the hub 36. The armature assembly 35B is located between the rotor 22B and the retention plate and, if the web 45B should tear or otherwise fail, the rotor and the retention plate coact to capture the various loose components of the armature assembly 35B and prevent such components from flying axially out of the clutch.

To advantage, the retention plate 80 also may be used as a means for limiting the released or retracted position of the armature assembly 35B. For this purpose, the retention plate carries a series of angularly spaced bumpers 82 adapted to engage the outer side of the enlarged portion 48B of the armature assembly, only one of the bumpers being visible. Each bumper 82 is attached to a threaded stud 83 which is screwed into the retention plate. By adjusting the studs, the bumpers 82 may be advanced toward or retracted away from the armature assembly in order to establish the width of the air gap 55 when the clutch is disengaged.

We claim:

1. An armature assembly for a selectively energizable and de-energizable electromagnetic coupling, said armature assembly comprising a hub having a central axis, a sleeve telescoped over said hub and captivated against rotational and axial movement relative to said hub, a generally circular web joined to and projecting radially from said sleeve and having inner and outer margins, the inner margin of said web being formed integrally with said sleeve, and an annular armature disc made of low magnetic reluctance material spaced radially from said hub and joined to said web, said web being axially thinner than said armature disc and being made of resiliently flexible plastic, and a living hinge integral with and located between said web and said sleeve adjacent the inner margin of the web to permit said armature disc to move axially back and forth relative to said hub when said electromagnetic coupling is energized and de-energized.

2. An armature assembly as defined in claim 1 in which said sleeve encapsulates and is bonded to at least a portion of said hub.

3. An armature assembly as defined in claim 2 further including angularly spaced and radially extending lugs formed integrally with said hub, the material of said sleeve filling the angular spaces between said lugs thereby to couple said hub and said sleeve for rotation in unison.

4. An armature assembly as defined in claim 3 in which each of said lugs defines a pair of shoulders which face in oppositely axial directions to captivate said sleeve axially on said hub.

5. An armature assembly as defined in claim 1 further including an annular and axially opening channel of generally C-shaped cross-section formed integrally with the outer margin of said web, said armature disc being secured within said channel.

6. An armature assembly as defined in claim 5 further including axially extending and angularly spaced holes formed in said armature disc, axially extending and angularly spaced pins formed integrally with said channel and projecting axially from said channel and through said holes, said pins having free ends, and means integral with the free ends of said pins for captivating said armature disc in said channel.

7. An armature assembly as defined in claim 1 in which said armature disc comprises a series of circumferentially extending and radially spaced rings which define poles, there being an axially enlarged portion integral with the outer margin of said web and made of the same material as said web, the material of said enlarged portion encapsulating portions of said rings and at least partially filling the spaces between said rings so as to captivate said rings and join said rings to said web.

8. An armature assembly for a selectively energizable and de-energizable electromagnetic coupling, said armature assembly comprising a hub having a central axis, a sleeve telescoped over said hub and captivated against rotational and axial movement relative to said hub, a generally circular web projecting radially from said sleeve and having an inner margin formed integrally with said sleeve, an annular and axially opening channel of generally C-shaped cross-section formed integrally with the outer margin of said web, and an annular armature disc made of low magnetic reluctance material captivated in said channel, said web being made of resiliently yieldable material and being sufficiently flexible to permit said armature disc to move axially back and forth relative to said hub and said sleeve when said electromagnetic coupling is energized and de-energized.

9. An armature assembly as defined in claim 8 further including angularly spaced and radially extending lugs formed integrally with said hub, each of said lugs defining a pair of shoulders which face in opposite axial directions, the material of said sleeve encapsulating said shoulders and filling the angular spaces between said lugs so as to captivate said sleeve against axial and rotational movement on said hub.

10. An armature assembly as defined in claim 8 further including axially extending and angularly spaced holes formed in said armature disc, axially extending and angularly spaced pins formed integrally with said channel and projecting axially from said channel and through said holes, said pins having free ends, and means on the free ends of said pins for captivating said armature disc axially in said channel.

11. An armature assembly as defined in claim 8 in combination with an electromagnetic field member having an axially facing and radially extending friction face, said armature disc being selectively movable into engagement with said friction face, inner and outer circumferentially extending lips extending axially from said friction face toward said armature disc, said disc being disposed radially between said lips and being retained loosely by said lips in the event said disc separates from said channel.

12. An armature assembly as defined in claim 8 in combination with an electromagnetic field member having an axially facing and radially extending friction face located adjacent one side of said channel, said armature disc being selectively movable into engagement with said friction face, and a retention member secured to and extending radially from said hub and disposed in opposing relation with the other side of said channel, said retention member coacting with said friction face to retain said web, said channel and said armature disc axially in the event said web separates from said sleeve.

13. An armature assembly as defined in claim 12 further including axially adjustable bumper means on said retention member for establishing a predetermined axial spacing between said armature disc and said friction face.

14. An armature assembly for a selectively energizable and de-energizable electromagnetic coupling, said armature assembly comprising a hub having a central axis, a web joined to and projecting radially from said hub and having an outer margin, an annular and axially opening channel of generally C-shaped cross-section formed integrally with the outer margin of said web, an annular armature disc made of low magnetic reluctance material spaced radially from said hub and located within said channel, axially extending and angularly spaced holes formed in said armature disc, axially extending and angularly spaced pins formed integrally with said channel and projecting axially from said channel and through said holes, said pins having free ends, means integral with the free ends of said pins for captivating said armature disc in said channel, and said web being made of resiliently flexible material to permit said armature disc to move axially back and forth relative to said hub when said electromagnetic coupling is energized and de-energized.

15. An armature assembly for a selectively energizable and de-energizable electromagnetic coupling, said armature assembly comprising a hub having a central axis, a web joined to and projecting radially from said hub and having an outer margin, an annular armature disc made of low magnetic reluctance material spaced radially from said hub and joined to said web, said web being made of resiliently flexible material to permit said armature disc to move axially back and forth relative to said hub when said electromagnetic coupling is energized and de-energized, said armature disc comprising a series of circumferentially extending and radially spaced rings which define poles, there being an axially enlarged portion integral with the outer margin of said web and made of the same material as said web, the material of said enlarged portion encapsulating portions of said rings and at least partially filling the spaces between said rings so as to captivate said rings and join said rings to said web.

* * * * *